March 19, 1963  H. G. KLEMM ETAL  3,082,044
ENDLESS TRACK DRIVING ASSEMBLY
Filed Oct. 10, 1960  3 Sheets-Sheet 1

INVENTORS.
HERMAN G. KLEMM,
ALEXANDER HING MARK &
WILLIAM G. COLESTOCK
BY
ATTORNEYS.

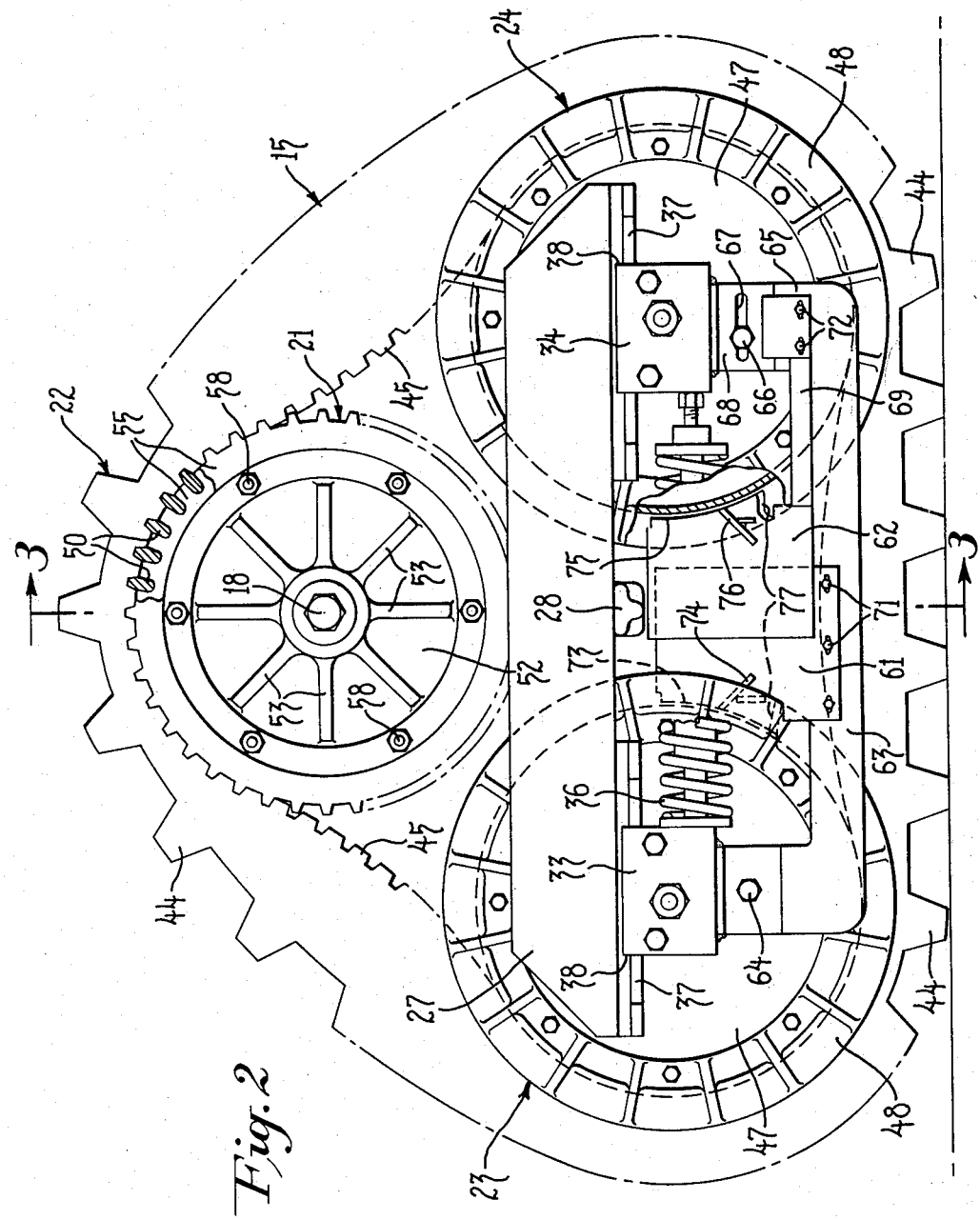

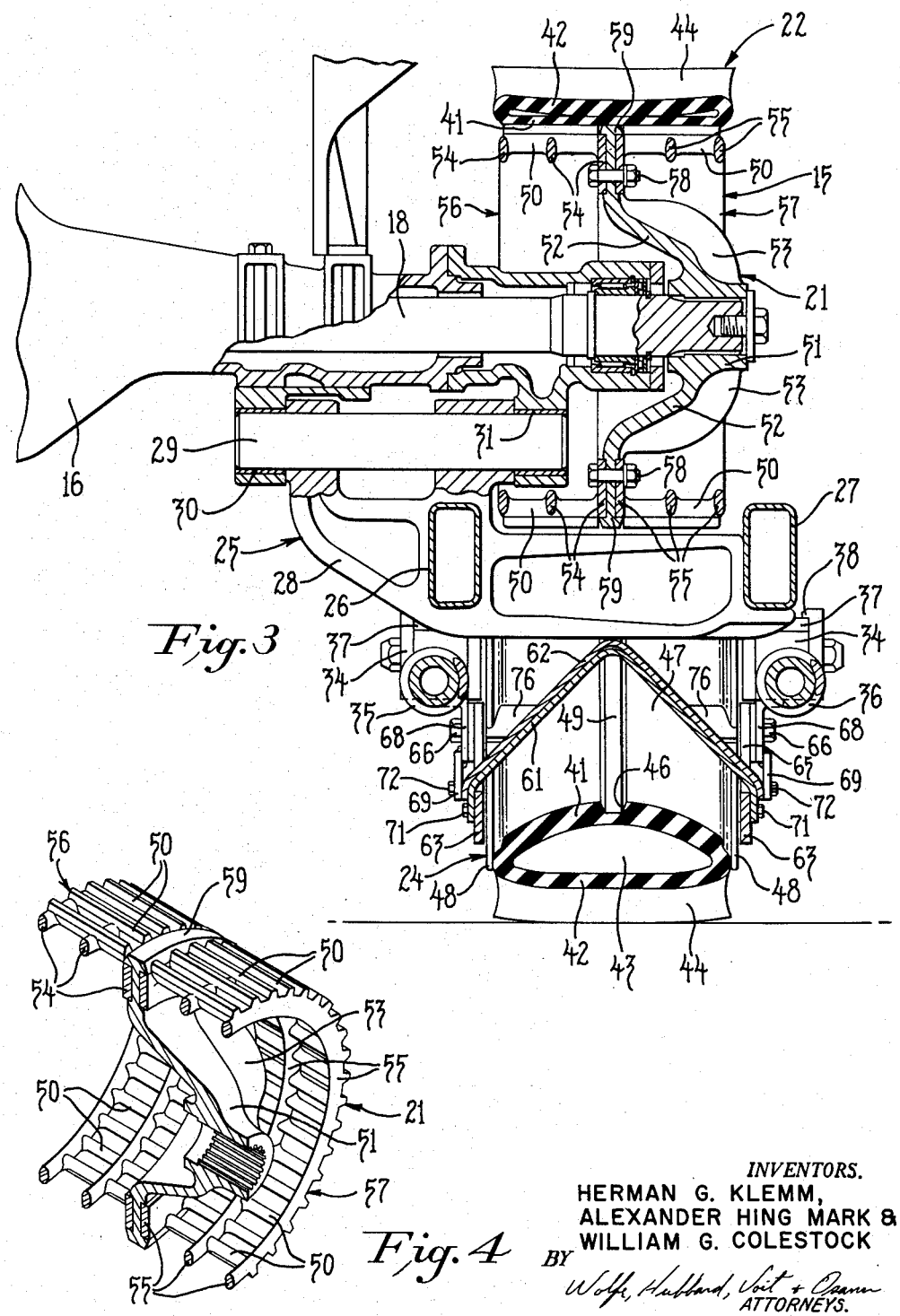

United States Patent Office 3,082,044
Patented Mar. 19, 1963

3,082,044
ENDLESS TRACK DRIVING ASSEMBLY
Herman G. Klemm, Birmingham, Alexander Hing Mark, Livonia, and William G. Colestock, Detroit, Mich., assignors to Massey-Ferguson Inc., Detroit, Mich., a corporation of Maryland
Filed Oct. 10, 1960, Ser. No. 61,427
4 Claims. (Cl. 305—12)

This invention relates to endless track driving assemblies for agricultural tractors and concerns, more particularly, improvements in such assemblies to overcome the effects of mud or other foreign material.

In order to provide a tractor with additional ground traction area so that the full power of the tractor can be translated into drawbar pull, it has been proposed to substitute endless track driving assemblies for the more conventional rear tractor drive wheels. One effective design for such assemblies utilizes a drive wheel secured to the rear axle of the tractor which drives an endless flexible track about a pair of idler wheels which are journalled beneath and fore and aft of the drive wheel on a pivoted bogie frame. To insure a positive drive, the inner surface of the track is preferably toothed and meshes with corresponding tooth portions on the drive wheel.

When testing drive assemblies of the above type, it was found that mud and trash created operating problems and, of course, an agricultural tractor is occasionally called upon to operate over such unfavorable terrain. Mud and foreign material tended to become trapped between the idler wheels and the track, thus increasing the effective diameter of the idler wheels and exerting increased, and undesirable, tension on the track. In addition, the cooperating teeth on the track and the drive wheel tended to become choked with mud with the result that, if not cleared, loss of driving torque was experienced.

In view of the foregoing, it is the primary aim of the invention to provide an improved endless track driving assembly which effectively avoids operational difficulties caused by mud, trash and similar foreign materials.

With more detail, it is an object of the invention to provide a novel mud guard for an endless track assembly as described above. It is a related object to provide a mud guard as referred to above that effectively shields and cleans the critical areas of the track assembly without hindering the free flexing mounting of the idler wheels requiring to keep the track properly tensioned.

Another more specific object is to provide a novel drive wheel for an endless track assembly of the type described above which cannot become mud clogged. A collateral object is to provide a drive wheel of the above character which can be economically manufactured in segments but which is particularly adapted to transmit a peripheral driving force to the track and resist side thrust forces exerted through the track.

Other objects and advantages of the invention will become apparent upon reading the following detailed description and upon reference to the drawings, in which:

FIG. 2 is an enlarged fragmentary view showing the endless track drive assembly appearing in FIG. 1;

FIG. 3 is a fragmentary section taken approximately along the line 3—3 in FIG. 2; and FIG. 4 is a section, in perspective, of the drive wheel utilized with the assembly shown in FIG. 1.

Figure 1:
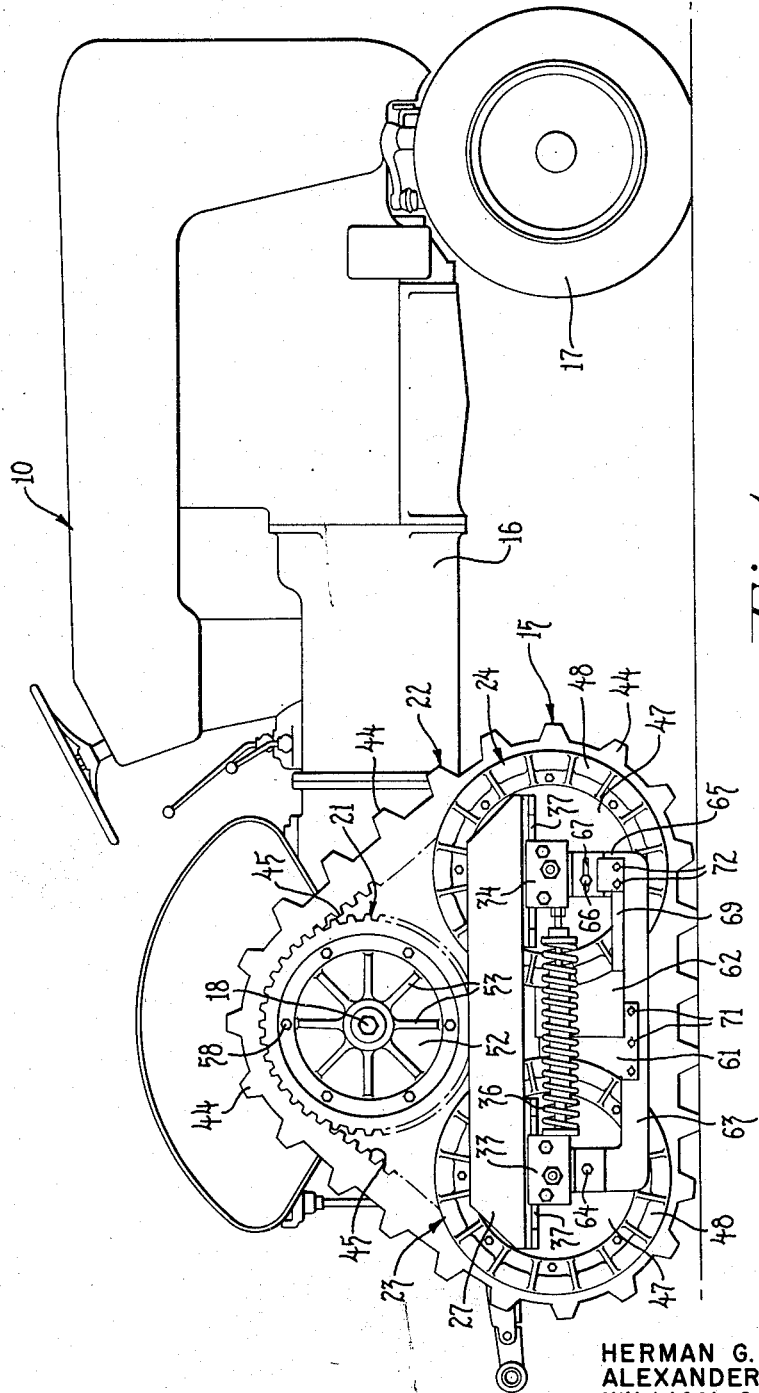
FIGURE 1 is a side elevation of an agricultural tractor utilizing an endless drive assembly embodying the invention.

While the invention will be described in connection with a preferred embodiment, it will be understood that we do not intend to limit the invention to that embodiment. On the contrary, we intend to cover all alternatives, modifications, and equivalents as may be included within the spirit and scope of the invention as defined by the appended claims.

Turning now to FIG. 1, there is shown an agricultural tractor 10 which includes an endless track drive assembly 15 embodying the present invention. The tractor 10 also includes a main frame or body 16 supported at the forward end by steerable wheels 17. A drive axle 18 is journalled transversely at the rear of the tractor body 16 and the assembly 15 is driven by the axle 18 so as to propel the tractor 10. The assembly 15 thus replaces a conventional rear tractor drive wheel, with one such assembly being provided on either side of the tractor. Since the two driving assemblies are identical except for being left and right hand units, only the assembly 15 has been illustrated and described.

In the illustrated embodiment, the assembly 15 includes a drive wheel 21 secured to the axle 18 so as to drive a flexible track 22 which is trained about the drive wheel and a pair of idler wheels 23 and 24. The idler wheels 23 and 24 are journalled on a bogie frame 25 that is pivoted on the tractor body 16 just below the axle 18. The bogie frame 25 includes a pair of parallel beams 26 and 27 joined at their midportion by a bracket 28. The bracket 28 supports a pivot shaft 29 which is journalled in bearings 30 and 31 mounted in the tractor body 16.

To keep the track 22 properly tensioned, the idler wheels 23, 24 are journalled in blocks 33 and 34, respectively, which are slidably mounted on the beams 26, 27 and resiliently urged apart by a pair of compressed helical springs 35 and 36. For slidably mounting the blocks 33, 34 plates 37 are rigidly mounted in slightly spaced relation to the underside of the beams 26, 27, and the blocks 33, 34 are provided with overhanging lips 38 which anchor the blocks to the plates for sliding movement along the beams 26, 27 (see FIG. 3).

In the preferred construction, the track 22 is of pneumatic type and is formed of inner and outer bands 41 and 42, respectively, which are joined at their lateral edges to form an inflatable chamber 43. The outer band 42 carries integrally formed ground engaging cleats 44 and the inner band 41 is provided with a plurality of closely spaced tooth portions 45. The tooth portions 45 are divided at approximately their midportions so as to define an annular groove 46 which runs about the inner surface of the track 22.

The idler wheels 23, 24 are formed of cylindrical drums 47 about which the track 22 is trained and which carry annular flanges 48 secured to either sidewall so as to positively center the track on the idler wheels. Desirably, a central peripheral flange 49 runs about each of the idler wheels and is received in the track groove 46.

In keeping with one aspect of the invention, the drive wheel 21 has a peripheral track engaging surface formed by a plurality of axially oriented bars 50 spaced to receive the track tooth portions 45. The bars 50 are supported on a hub 51 that is splined onto the axle 18 and which supports an integral web 52 having stiffening flanges 53. In the preferred construction, the bars 50 are arranged in two groups, with each group being rigidly secured to a plurality of rings 54 and 55, respectively, so as to form two squirrel cage-like units 56 and 57. A plurality of bolts 58 rigidly mount the squirrel cage units 56, 57 on either side of the hub web 52 with the web extending outwardly between the units 56, 57 so as to define an annular flange 59 that completely surrounds the drive wheel 21 and is adapted to fit snugly into the track groove 46.

To facilitate the clearing of mud from the drive wheel 21, the bars 50 and the outermost rings 54, 55 in the two squirrel cage units 56, 57 are streamlined as seen in cross section (see FIGS. 2 and 3). In addition, the center of the drive wheel beneath the bars 50 and their supporting rings 54, 55, is open and, as a result, mud and other foreign material is easily cleared from between the bars and rings by being pushed inwardly by the track 22 where it can drop freely to the ground. It will also be noted that the drive wheel web 52 is somewhat conical in configuration so that it partially encloses and shields the opening in the tractor body 16 through which the drive axle 18 passes. This minimizes the likelihood of dirt finding its way into the bearings supporting the axle.

It is also important to note that the annular flange 59 on the drive wheel 21 cooperates with the track groove 46 to hold the track centered on the drive wheel. The flange 59 is an integral part of the web 52 so that side thrust forces exerted on the track are transferred directly to the hub 51 of the drive wheel. The bolts 58 are not called upon to resist these forces.

Pursuant to another aspect of the invention, a pair of closely fitting, telescoping arched plates 61 and 62 are mounted so as to span the lower run of the track 22 between the idler wheels 23, 24. The plate 61 is carried on a pair of bars 63 which are anchored by bolts 64, only one of which is shown, to the blocks 33 journalling the idler wheel 23. The opposite ends of the bars 63 have upturned portions 65 that carry bolts 66 which slidably pass through slots 67, only one of which is shown, formed in brackets 68 mounted on the blocks 34. The bars 63 are thus fixed to the blocks 33 at one end and are slidably supported by the blocks 34 at their opposite ends.

The plate 62 is supported by a pair of bars 69 which extend toward the blocks 34 and are rigidly secured to the brackets 68. The plate 62 itself rests on the underlying plate 61 and hence no further support for the bars 69 is required. Preferably, the plates 61, 62 can be adjustably positioned relative to the adjacent idler wheels 23, 24 by interposed bolt and slot connections 71 and 72, respectively.

In the preferred construction, the plates 61, 62 are provided with scraping portions disposed closely adjacent, and across the width of, the outer cylindrical surfaces of the idler wheels 23, 24. In the illustrated assembly, the scraping portion of the plate 61 is defined by the upper left hand edge 73 of the plate, as seen in FIG. 2, together with a pair of side members 74, only one of which is shown. The scraping portion of the plate 62 includes the upper right hand edge 75 of the plate together with a pair of side members 76 (see also FIG. 3). The plate portion 75 and the two side members 76 extend across the entire width of the idler wheel 24, and the plate edge 73 and the members 74 extend across the entire width of the idler wheel 23. So as to provide clearance for the flange members 48 of the idler wheels, each of the plates 61, 62 is formed with notches 77 which receive the flange members supported by the respective idler wheels.

In operation, the bolt and slot connections 71, 72 are adjusted so that the plates 61, 62 and the side members 74, 76 which they support are closely adjacent the peripheries of the respective idler wheels so as to both shield the nip between the idler wheels and the lower run of the track 22 and also scrape mud and other accumulated foreign material from the cylindrical surfaces of the idler wheels. Because of the arched shape of the plates 61, 62, material scraped from the idler wheels falls freely to either side of the track 22.

Because of the overlapping, telescoping disposition of the plates 61, 62, it can be seen that these plates continue to perform their shielding and scraping functions without interfering with the adjustable positioning of the idler wheels 23, 24 under the influence of the compressed springs 35, 36.

In summary, it can be seen that the assembly 15 effectively avoids operational difficulties arising from encounters with mud, trash or other foreign material. The drive wheel 21, because of its open squirrel cage construction, is virtually self-clearing and cannot become clogged so as to lose its driving engagement with the track 22. The plates 61, 62 prevent material from accumulating about the idler wheels 23, 24 without interfering with the adjustable mounting of the idler wheels. Those skilled in the art will appreciate that the construction of the drive wheel 21, and of the plates 61, 62 together with their mounting assemblies, can be economically accomplished on a mass production basis.

We claim as our invention:

1. In an endless track driving assembly having the lower run of a flexible track trained about a pair of spaced wheels mounted for relative movement toward and away from one another, the combination comprising, a first arched plate spanning said lower run of the track adjacent one of said wheels, said first plate being fixed relative to said one wheel, and a second arched plate spanning said lower run of the track adjacent the other of said wheels, said second plate being fixed relative to said other wheel, said plates being overlapped in close fitting relation for telescoping movement upon said relative movement between the spaced wheels.

2. In an endless track driving assembly having the lower run of a flexible track trained about a pair of spaced idler wheels mounted for relative movement toward and away from one another, the combination comprising, a first arched plate spanning said lower run of the track adjacent one of said idler wheels, said first plate being fixed relative to said one wheel and having scraping portions disposed across the width of said wheel, and a second arched plate spanning said lower run of the track adjacent the other of said idler wheels, said second plate being fixed relative to said other wheel and having scraping portions disposed across the width of said wheel, said plates being overlapped in close fitting relation for telescoping movement upon said relative movement between the spaced wheels.

3. In an endless track driving assembly having the lower run of a flexible track trained about a pair of spaced wheels journalled in blocks which are mounted for relative movement toward and away from one another, the combination comprising a first plate spanning said lower run of the track adjacent one of said wheels, a second plate spanning said lower run of the track adjacent the other of said wheels, a first bar supporting said first plate and being fixed to the blocks journalling said one wheel and slidably supported by the blocks supporting the other wheel, and a second bar supporting said second plate being fixed to the blocks journalling said other wheel, said second plate overlapping and being supported by said first plate.

4. In an endless track driving assembly having the lower run of a flexible track trained about a pair of spaced flanged wheels journalled in blocks which are mounted for relative movement toward and away from one another, the combination comprising a first arched plate spanning said lower run of the track adjacent one of said wheels, said first plate having notches for receiving the flanges of said one wheel and also having scraping portions disposed across the width of said wheel, a second arched plate spanning said lower run of the track adjacent the other of said wheels, said second plate having notches for receiving the flanges of said other wheel and also having scraping portions disposed across the width of said wheel, a first bar supporting said first plate and being fixed to the blocks journalling said one wheel and slidably supported by the blocks supporting the other wheel, and a second bar supporting said second plate being fixed to the blocks journalling said other wheel, said second plate overlapping and being supported by said first plate with the plates being in close fitting, telescoping relation.

References Cited in the file of this patent

UNITED STATES PATENTS

| | | |
|---|---|---|
| 1,571,628 | Hendrickson | Feb. 2, 1926 |
| 1,741,878 | Rasmussen | Dec. 31, 1929 |
| 1,774,835 | Lombard | Sept. 2, 1930 |
| 1,808,735 | Henneuse et al. | June 2, 1931 |
| 1,885,430 | George | Nov. 1, 1932 |
| 2,631,459 | Transeau | Mar. 17, 1953 |
| 2,770,977 | Beckadolph et al. | Nov. 20, 1956 |